(12) United States Patent  
Ohlendorf

(10) Patent No.: US 7,937,841 B2  
(45) Date of Patent: May 10, 2011

(54) ELECTRIC JIGSAW

(75) Inventor: Oliver Ohlendorf, Landsberg (DE)

(73) Assignee: Hilti Aktiengesellschaft, Schaan (LI)

( * ) Notice: Subject to any disclaimer, the term of this patent is extended or adjusted under 35 U.S.C. 154(b) by 580 days.

(21) Appl. No.: 12/082,197

(22) Filed: Apr. 8, 2008

(65) Prior Publication Data

US 2008/0289196 A1   Nov. 27, 2008

(30) Foreign Application Priority Data

Apr. 11, 2007   (DE) .................... 10 2007 000 216

(51) Int. Cl.  
 B23D 49/16   (2006.01)
(52) U.S. Cl. .................................... 30/392; 30/393
(58) Field of Classification Search ............. 30/392–394  
See application file for complete search history.

(56) References Cited

U.S. PATENT DOCUMENTS

| | | | | |
|---|---|---|---|---|
| 2,631,619 | A * | 3/1953 | Folli ................................. | 83/98 |
| 3,033,252 | A * | 5/1962 | Atkinson ......................... | 30/392 |
| 6,226,877 | B1 * | 5/2001 | Ono .................................. | 30/392 |
| 7,424,779 | B2 * | 9/2008 | Tozawa et al. ................... | 30/392 |
| 7,506,447 | B2 * | 3/2009 | Wheeler et al. ................. | 30/392 |
| 2007/0237591 | A1 * | 10/2007 | Ohlendorf ....................... | 408/61 |
| 2007/0261871 | A1 * | 11/2007 | Ohlendorf ....................... | 173/212 |
| 2008/0289196 | A1 * | 11/2008 | Ohlendorf ....................... | 30/392 |

FOREIGN PATENT DOCUMENTS

DE         199 21988 A1 * 11/1999

* cited by examiner

*Primary Examiner* — Hwei-Siu C Payer  
(74) *Attorney, Agent, or Firm* — Abelman, Frayne & Schwab

(57) ABSTRACT

An electric saw (2) includes a stroke arrangement (4) driven in a reciprocating manner and having a tool receptacle (8) for a saw blade (10), a housing (14) which extends along a stroke axis (A) of the stroke arrangement (4) and which forms at a working tool-side end (12) a housing opening (16) from which the stroke arrangement (4) projects, and which forms a receiving space (26) in which is arranged a motion transforming device (24), the stroke arrangement (4) being supported at the housing (14) by a bearing element (30) which forms a sliding bearing (28) and is arranged between the motion transforming device (24) and the housing opening (16), with an air flow (L) being directed toward the housing opening (16) so that particles (P) can be prevented from entering the sliding bearing (28), with the bearing element (30) limiting the receiving space (26) toward the housing opening (16), and with a flow path (46) by which the air flow (L) is guided being provided at an outer side (40) of the bearing element (30) facing the housing opening (16).

13 Claims, 3 Drawing Sheets

ELECTRIC JIGSAW

BACKGROUND OF THE INVENTION

1. Field of the Invention

The present invention relates to an electric saw including a stroke arrangement which can be driven in a reciprocating manner and which has a tool receptacle in which a saw blade can be fixed. Further, the saw has a housing which extends along a stroke axis of the stroke arrangement and which forms, at its working tool-side end, an opening from which the stroke arrangement projects. The housing forms a receiving space in which there is arranged a motion transforming device which is formed, for example, by a gear unit, a motion transformer for transforming rotation into a reciprocating lateral motion, or by a combination of the two. The stroke arrangement is supported at the housing by a bearing element. The bearing element forms a sliding bearing for the stroke arrangement and is arranged between the motion transforming device and the housing opening. Further, an air flow can be directed to the housing opening in order to prevent dirt particles or dust particles from reaching the sliding bearing or the motion transforming device.

2. Description of the Prior Art

In jigsaws of the type mentioned above, dirt particles and dust particles can be prevented from penetrating into the housing via the working tool-side housing opening at least to a great extent by the available air flow. This minimizes the risk of increased wear or damage as a consequence of soiling of the sliding bearing or of the motion transforming device.

A sealing structure for application in a reciprocating saw is known from DE 199 21 988 A1. It has a chamber of the gear unit housing which is sealed by a dust seal and a rubber packing. A sliding bearing of a sliding block carrying the working tool and a motion transformer are accommodated in the chamber. An air flow arising as a result of an overpressure generated in the chamber by the sliding block exits recurrently from the chamber and past the dust seal provided at the working tool-side end of the chamber. Further, a seal holder with a felt ring is provided between the dust seal and a working tool-side housing opening. An air flow toward the housing opening, which is intended to minimize the entry of dust into the chamber through the dust seal, is provided at the side of the felt ring remote of the dust seal.

The known jigsaw is disadvantageous in that the resources for sealing the chamber and the additional production costs arising therefrom are relatively large. Further, because of a vacuum pressure which is recurrently built up in the chamber and by which air is sucked in via a valve arranged remote of the tool, there is a risk that air containing substantial dust will also be sucked in via the dust seal on the tool side. This risk exists in particular because the dust seal is stressed relatively severely by the air circulation exiting from the chamber, which leads to relatively rapid material fatigue. Accordingly, particles can enter through the dust seal into the chamber, where they cause increased wear on the sliding bearing and motion transformer.

SUMMARY OF THE INVENTION

An object of the present invention is a jigsaw capable of overcoming the above-mentioned disadvantages in a conventional jigsaw and in which wear is reduced while keeping production costs low.

According to the invention, this and other objects of the present invention, which will become apparent hereinafter, are met by providing an electric jigsaw wherein the bearing element limits the receiving space toward the housing opening, and a flow path by which the air flow is continuously guided toward the housing opening during operation, is provided at an outer side of the bearing element facing the housing opening. In this way, the bearing element itself can be used as a barrier against the entry of particles into the receiving space, and the air flow which is permanently available in operation prevents particles from impinging on the sliding bearing and thus entering the receiving space. In this way, increased wear due to dirt particles and dust particles at the sliding bearing or at the motion transforming device in the receiving space can be effectively prevented.

In a particularly preferred embodiment, the flow path is partly limited laterally by the bearing element. In this way, the air flow passes directly along the sliding bearing so that the latter is effectively protected from dirt particles and dust particles.

The bearing element advantageously forms a deflecting area of the flow path so that areas with a particularly high air pressure can be formed directly at the bearing element because of deflection-dependent flow resistances, the entry of particles into the sliding bearing being safely prevented in this way. Further, this kind of added function of the bearing element as air guide means makes possible a simpler and more economical manufacture of the housing.

The flow path preferably has an influx area which is directed to the bearing element and which extends radially with respect to the stroke axis and an axially extending outflow area directed away from the sliding bearing to the housing opening. By means of this type of deflection of the air flow by 90°, areas with a particularly high air pressure occur at the bearing element so that the sliding bearing can be shielded in a particularly effective manner from particles. In addition, a radially extending influx area of this kind can be connected especially well to an external fan device or a fan device which is integrated in the jigsaw in order to generate the air flow.

The flow path toward the housing opening advantageously has a narrowing profile. In this way, a jet effect or nozzle effect is generated which provides improved protection against the entry of particles.

Further, in an advantageous manner, the narrowing profile is partly limited by an air-conducting element which is inserted into the housing between the bearing element and the housing opening. In this way, a relatively complex shape of the profile of the flow path can be produced independent from the manufacture of the rest of the housing, which allows for an optimal guidance of air with minimal additional production costs.

In a particularly advantageous embodiment, the flow path extends around the stroke arrangement, which makes possible a circumferentially distributed air flow that ensures a complete shielding of the sliding bearing.

In this connection, it is advantageous when the flow path is formed circularly around the stroke arrangement, which makes possible a particularly uniform air flow circumferentially.

A cross-sectional surface of the stroke arrangement and a cross-sectional surface of the flow path advantageously have a ratio of 1 to 11.5, preferably 5 to 6, at a common axial height at a narrowest location of the flow path in radial direction. In this way, an efficient shielding of the sliding bearing can be ensured on the one hand without the risk of a direct contact between the reciprocating stroke arrangement and stationary boundaries of the flow path on the other hand. In particular, in the operation of a saber saw provided herein, a ratio of 5 to 6 ensures that no such damaging contact comes about under the occurring stresses and deformations of the stroke arrange- } ment and that a relatively strong air flow is directed to the housing opening at the same time.

Further, it is advantageous when the flow path has a profile height of between 0.3 mm and 3 mm at the narrowest point in radial direction so that damaging contact between the reciprocating stroke arrangement and stationary boundaries of the flow path can be prevented in a particularly secure manner.

Further, the flow path advantageously has a permanent fluidic connection to a fan wheel of the jigsaw. This ensures that the sliding bearing will be protected from particles at all times by the air flow when the jigsaw is in operation.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

BRIEF DESCRIPTION OF THE DRAWINGS

The drawings show.

DETAILED DESCRIPTION OF THE PREFERRED EMBODIMENT

Figure 1:
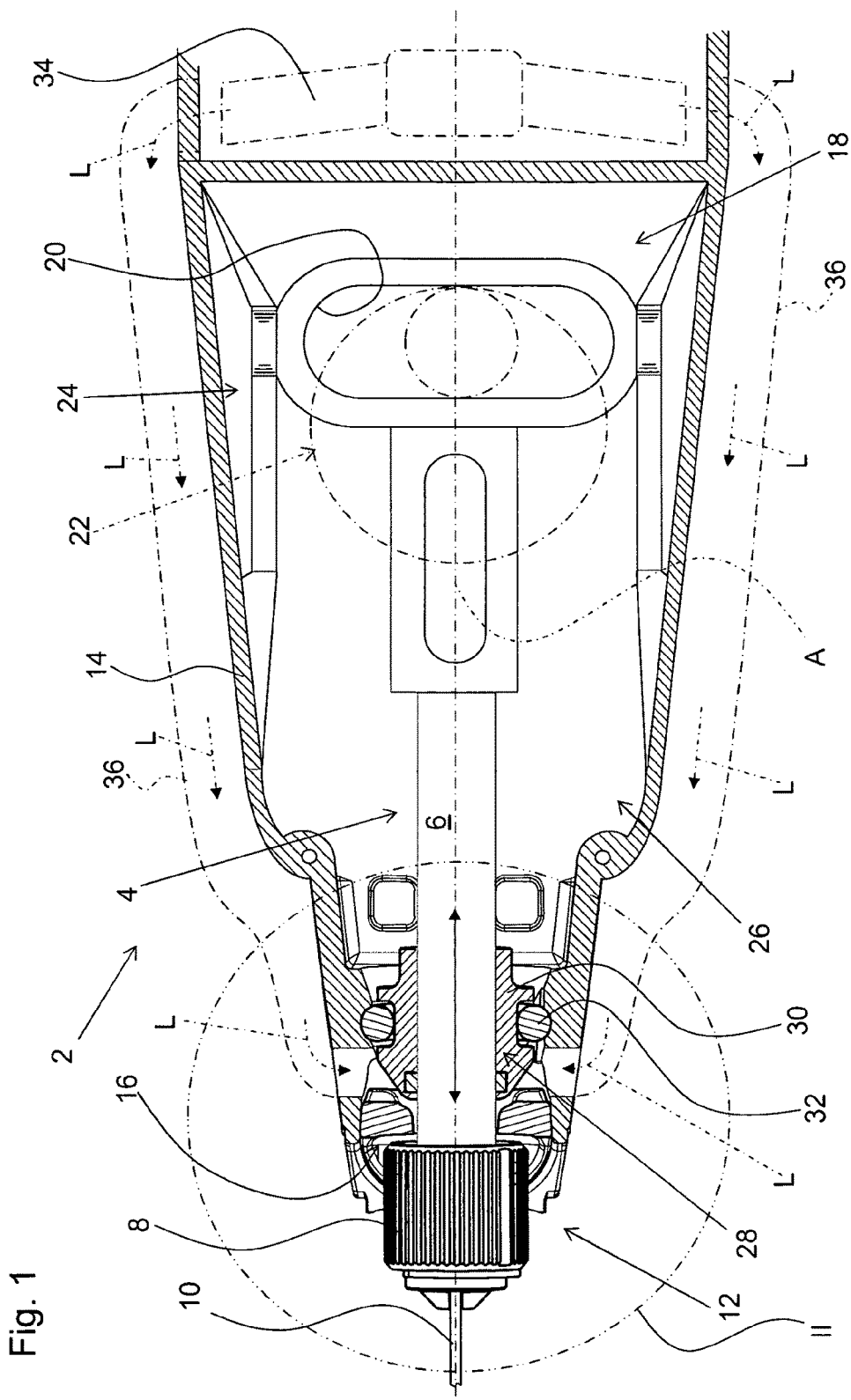
FIG. 1 a partial cross-sectional view of a working tool-side portion of a saw according to the present invention.

FIG. 1 shows an electric jigsaw 2 in the form of a saber saw having a stroke arrangement 4 with a work spindle 6 at which a tool receptacle 8 is provided for fixing a working tool in the form of a saw blade 10. The stroke arrangement 4 projects out of the housing 14 through a housing opening 16 at a working tool-side end 12 of a housing 14 of the jigsaw 2. Further, at a saw-side end 18, the stroke arrangement 4 has a crank member 20 which an eccentric drive 22, shown in dash-dot lines, engages in order to apply a reciprocating motion to the saw 2 along the stroke axis A when operating. In this way, the crank member 20 and the eccentric drive 22 form a motion transforming device 24 which transforms a rotational motion of the eccentric drive 22 into the above-mentioned reciprocating motion.

The motion transforming device 24 is arranged in a closed receiving space 26. As an alternative to the motion transforming device 24 shown herein or in addition to it, a motion transforming device can also include parts of a gear unit, not shown, of the jigsaw.

In each instance, the receiving space 26 is limited toward the housing opening 16 by a cup-shaped bearing element 30 which forms a sliding bearing 28 for the stroke arrangement 4 and is supported by an O-ring 32 in the housing 14.

Further, as is shown in dash-dot lines in FIG. 1, the jigsaw 2 has a fan wheel 34 which, for example, is part of a motor cooling arrangement, not shown in more detail. By means of this fan wheel 34, as is indicated by the family of arrows L, an air flow is generated which is guided over channels 36 to the working tool-side end 12 of the housing 14. The channels 36 can be arranged on the outer side of the housing 14, as is shown, or alternatively can be integrated partly or completely in the housing 14. Further, it is also possible to provide only one individual channel 36.

Figure 2:
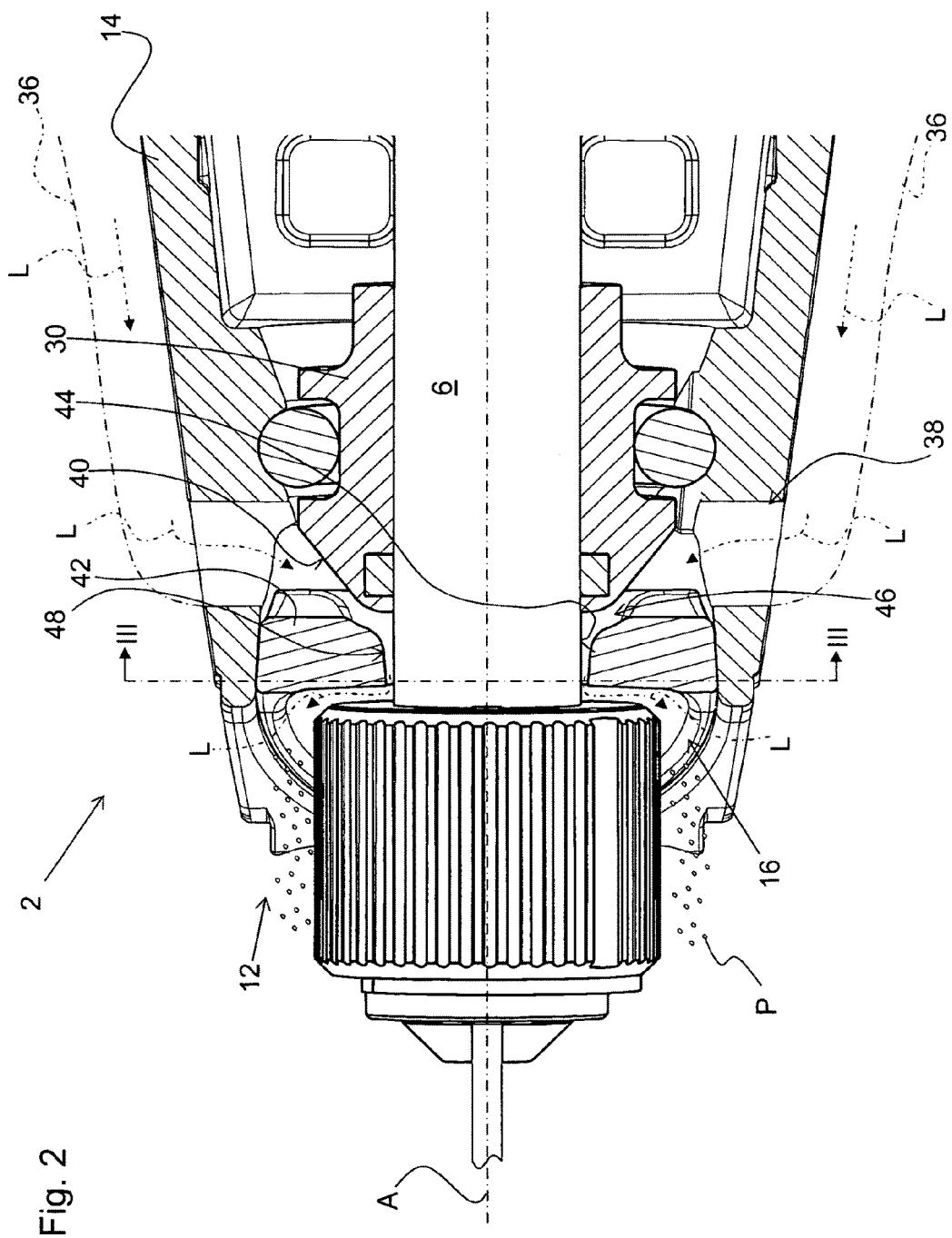
FIG. 2 an enlarged view of detail II from FIG. 1.

An enlarged view of the working tool-side end 12 of the housing 14 is shown in FIG. 2. As can be seen, the channels 36 open, respectively, into an influx area 38 which is formed by a radially extending borehole in the housing 14. The influx areas 38 are directed to an outer side 40 of the cup-shaped bearing element 30, an outer side 40 of which faces the housing opening 16. This cup-shaped bearing element 30 is conically shaped and decreases in diameter toward the housing opening 16. In this way, the outer side 40 of the bearing element 30 forms a deflecting area for the air flow L.

Figure 3:
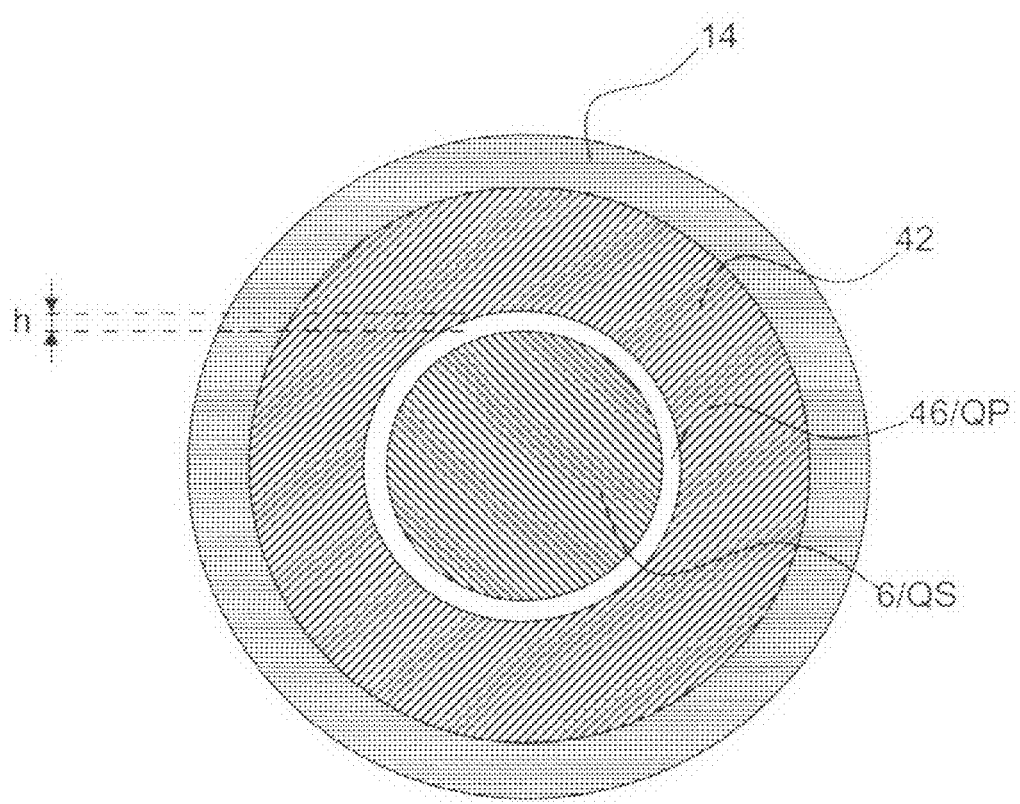
FIG. 3 a cross-sectional view through a narrowest point of the flow path.

As can further be seen from FIG. 2, an annular air-conducting element 42 is inserted at the housing opening 16 and, together with the conical outer side 40 of the bearing element 30 and a cylindrical surface 44 of the working spindle 6, forms a circular flow path 46 which, as can be seen particularly in FIG. 3, conducts the air flow L circularly around the work spindle 6 along the outer side 40 and then to the housing opening 16.

The flow path 46 forms an axially extending flow-off area 48 with a profile that narrows in direction of the housing opening 16. At the narrowest point of this flow-off area 48, a cross-sectional surface of the work spindle QS and a cross-sectional surface of the flow path QP have a ratio of 1 to 11.5, in particular 5 to 6, wherein the profile height h of the flow-off area 48 at this narrowest point is 0.3 mm to 3 mm.

Accordingly, when the jigsaw 2 is operating the air flow L is blown into the flow path 46 via the channels 36 and the influx areas 38 as soon as the fan wheel 34 is driven. It blows past the outer side 40 of the bearing element 30, which forms the sliding bearing 28 for the stroke arrangement 4, and, at the same time, closes the receiving opening 26 and is now redirected into the flow-off area 48. A nozzle effect is created herein as a result of the narrowing profile, which increases the speed of the air flow L. Subsequently, the air flow L exits from the flow path 46 and the housing opening 16 at the increased speed.

In this way, dirt particles and dust particle P which reach the area of the housing opening 16, as is shown in FIG. 2, are already effectively prevented by the air flow L from entering the housing 14 and particularly the area of the sliding bearing 28 and the receiving space 26. This prevents increased wear at the sliding bearing 28 and at the motion transforming device 24 provided in the receiving space 26.

Though the present invention was shown and described with references to the preferred embodiment, such is merely illustrative of the present invention and is not to be construed as a limitation thereof and various modifications of the present invention will be apparent to those skilled in the art. It is, therefore, not intended that the present invention be limited to the disclosed embodiment or details thereof, and the present invention includes all variations and/or alternative embodiments within the spirit and scope of the present invention as defined by the appended claims.

What is claimed is:
1. An electric saw (2), comprising a stroke arrangement (4) which can be driven in a reciprocating manner and which has a tool receptacle (8) in which a saw blade (10) can be fixed; a housing (14) which extends along a stroke axis (A) of the stroke arrangement (4) and which forms, at a working tool-side end thereof (12), a housing opening (16) from which the stroke arrangement (4) projects, and which forms a receiving space (26) in which a motion transforming device (24) is arranged; a bearing element (30) which supports the stroke arrangement (4) at the housing (14) and forms a sliding bearing (28) between the motion transforming device (24) and the housing opening (16); and means for generating an air flow (L) toward the housing opening (16) so that particles (P) can be prevented from entering the sliding bearing (28), wherein the bearing element (30) limits the receiving space (26)

toward the housing opening (16), and a flow path (46) by which the air flow (L) is guided is provided at an outer side (40) of the bearing element (30) facing the housing opening (16),
  wherein the flow path (46) toward the housing opening (16) has a narrowing profile, and
  wherein the narrowing profile is partly limited by an air-conducting element (42) which is inserted into the housing (14) between the bearing element (30) and the housing opening (16).

2. An electric saw according to claim 1, wherein the flow path (46) is partly limited by the bearing element (30).

3. An electric saw according to claim 2, wherein the bearing element (30) forms a deflecting area of the flow path (46).

4. An electric saw according to claim 3, wherein the flow path (46) has an influx area (38) which is directed to the bearing element (30) and which extends radially with respect to the stroke axis (A) and an axially extending outflow area (48) directed away from the sliding bearing (28) to the housing opening (16).

5. An electric saw according to claim 1, wherein the flow path (46) extends around the stroke arrangement (4).

6. An electric saw according to claim 5, wherein the flow path (46) is formed circularly around the stroke arrangement (4).

7. An electric saw according to claim 1, wherein a cross-sectional surface (QS) of the stroke arrangement (4) and a cross-sectional surface of the flow path (QP) have a ratio of 1 to 11.5 at a common axial height at a narrowest location of the flow path (46) in radial direction.

8. An electric saw according to claim 7, wherein a cross-sectional surface of the stroke arrangement (QS) and a the ratio is between 5 to 6.

9. An electric saw according to claim 7, wherein the flow path (46) has a profile height (h) of between 0.3 mm and 3 mm at the narrowest point in radial direction.

10. An electric saw according to claim 1, wherein the flow path (46) has a permanent fluidic connection to a fan wheel (34) that forms the air flow generating means.

11. An electric saw (2), comprising a stroke arrangement (4) which can be driven in a reciprocating manner and which has a tool receptacle (8) in which a saw blade (10) can be fixed; a housing (14) which extends along a stroke axis (A) of the stroke arrangement (4) and which forms, at a working tool-side end thereof (12), a housing opening (16) from which the stroke arrangement (4) projects, and which forms a receiving space (26) in which a motion transforming device (24) is arranged; a bearing element (30) which supports the stroke arrangement (4) at the housing (14) and forms a sliding bearing (28) between the motion transforming device (24) and the housing opening (16); and means for generating an air flow (L) toward the housing opening (16) so that particles (P) can be prevented from entering the sliding bearing (28), wherein the bearing element (30) limits the receiving space (26) toward the housing opening (16), and a flow path (46) by which the air flow (L) is guided is provided at an outer side (40) of the bearing element (30) facing the housing opening (16),
  wherein a cross-sectional surface (QS) of the stroke arrangement (4) and a cross-sectional surface (QP) of the flow path (46) have a ratio of 1 to 11.5 at a common axial height at a narrowest location of the flow path (46) in radial direction.

12. An electric saw according to claim 11, wherein the ratio is between 5 to 6.

13. An electric saw according to claim 11 wherein the flow path (46) has a profile height (h) of between 0.3 mm and 3 mm at the narrowest point in radial direction.

* * * * *